(12) United States Patent
Chung et al.

(10) Patent No.: US 11,993,055 B2
(45) Date of Patent: May 28, 2024

(54) FLEXIBLE DISPLAY DEVICE AND UPPER FILM THEREFOR

(71) Applicant: Samsung Display Co., LTD., Yongin-si (KR)

(72) Inventors: Seung Hwan Chung, Seongnam-si (KR); Hung Kun Ahn, Seongnam-si (KR); Seokwon Jang, Seoul (KR); Danbi Myung, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/902,477

(22) Filed: Sep. 2, 2022

(65) Prior Publication Data

US 2023/0173789 A1    Jun. 8, 2023

(30) Foreign Application Priority Data

Dec. 3, 2021  (KR) .................... 10-2021-0171734

(51) Int. Cl.
| | |
|---|---|
| *B32B 15/04* | (2006.01) |
| *B32B 23/00* | (2006.01) |
| *B32B 23/08* | (2006.01) |
| *B32B 27/08* | (2006.01) |
| *B32B 27/28* | (2006.01) |

(Continued)

(52) U.S. Cl.
CPC .............. *B32B 15/04* (2013.01); *B32B 23/00* (2013.01); *B32B 23/08* (2013.01); *B32B 27/08* (2013.01); *B32B 27/281* (2013.01); *B32B 27/308* (2013.01); *B32B 27/325* (2013.01); *B32B 27/36* (2013.01); *B32B 27/365* (2013.01); *B32B 27/40* (2013.01); *B32B 7/12* (2013.01); *B32B 2255/10* (2013.01); *B32B 2270/00* (2013.01); *B32B 2307/412* (2013.01); *B32B 2307/518* (2013.01); *B32B 2307/552* (2013.01);

(Continued)

(58) Field of Classification Search
CPC ....... B32B 7/12; B32B 27/40; B32B 2270/00; B32B 2307/412; B32B 2307/518; B32B 2307/552

See application file for complete search history.

(56) References Cited

U.S. PATENT DOCUMENTS

| | | | |
|---|---|---|---|
| 2003/0160735 A1* | 8/2003 | Lee .......................... | G06F 3/147 345/4 |
| 2007/0171372 A1* | 7/2007 | Seal .......................... | A61H 5/00 351/245 |

(Continued)

FOREIGN PATENT DOCUMENTS

| | | |
|---|---|---|
| KR | 1020170070917 | 6/2017 |
| KR | 1020180062273 | 6/2018 |

(Continued)

*Primary Examiner* — Abbas I Abdulselam
(74) *Attorney, Agent, or Firm* — CANTOR COLBURN LLP

(57) ABSTRACT

The disclosure relates to a flexible display device including: a display panel including a touch sensor, where the display panel is foldable with respect to a folding axis; a cover window disposed on a front surface of the display panel; and a front surface film disposed on a front surface of the cover window, where the front surface film includes a protection film, and a base film having a transverse direction, and the transverse direction is perpendicular to a direction of the folding axis.

20 Claims, 15 Drawing Sheets

(51) Int. Cl.
  *B32B 27/30*  (2006.01)
  *B32B 27/32*  (2006.01)
  *B32B 27/36*  (2006.01)
  *B32B 27/40*  (2006.01)
  *B32B 7/12*   (2006.01)

(52) U.S. Cl.
  CPC ... *B32B 2307/558* (2013.01); *B32B 2307/732* (2013.01); *B32B 2457/20* (2013.01)

(56) References Cited

U.S. PATENT DOCUMENTS

| | | | | |
|---|---|---|---|---|
| 2013/0343012 | A1* | 12/2013 | Park | H04M 1/0266 |
| | | | | 361/679.01 |
| 2018/0178494 | A1* | 6/2018 | Kim | G09F 9/30 |
| 2018/0284534 | A1* | 10/2018 | Song | G02F 1/133528 |
| 2018/0294441 | A1* | 10/2018 | Brotzman | B32B 37/12 |
| 2019/0372051 | A1* | 12/2019 | Kwon | H10K 77/111 |
| 2021/0125528 | A1* | 4/2021 | Kim | C08J 5/18 |

FOREIGN PATENT DOCUMENTS

| | | |
|---|---|---|
| KR | 1020190035919 | 4/2019 |
| KR | 102040299 | 11/2019 |
| KR | 1020210039542 | 4/2021 |
| KR | 1020210082296 | 7/2021 |

\* cited by examiner

FIG. 9

| UF thickness (μm) | Compressed stress analysis values |
|---|---|
| 120 | 5.18% |
| 140 | 5.47% |
| 160 | 5.87% |
| 180 | 6.13% |
| 200 | 6.49% |
| 220 | 6.89% |

FIG. 10

| | TBF thickness (μm) | PF thickness (μm) | Thickness ratio of TPF to PF | 150,000-numbered folding estimations at 60°C and 93% |
|---|---|---|---|---|
| Embodiment 1 | 65 | 40 | 65% | OK |
| Embodiment 2 | 65 | 60 | 92% | OK |
| Embodiment 3 | 100 | 60 | 60% | OK |
| Embodiment 4 | 100 | 80 | 80% | OK |
| Comparative example 1 | 65 | 80 | 123% | Film peeled off |
| Comparative example 2 | 65 | 100 | 154% | Film peeled off |
| Comparative example 3 | 100 | 100 | 100% | Film peeled off |

FIG. 12

| | Short-side Modulus (GPa) | Long-side Modulus (GPa) | Cutting direction and folding region | |
|---|---|---|---|---|
| Embodiment 5 | 4.1 (MD) | 5.0 (TD) | | |
| Comparative example 4 | 5.0 (TD) | 4.1 (MD) | | |

FLEXIBLE DISPLAY DEVICE AND UPPER FILM THEREFOR

This application claims priority to Korean Patent Application No. 10-2021-0171734, filed on Dec. 3, 2021, and all the benefits accruing therefrom under 35 U.S.C. § 119, the content of which in its entirety is herein incorporated by reference.

BACKGROUND

1. Field

The disclosure relates to a flexible display device and an upper film for the flexible display device, and in particular relates to a flexible display device for preventing defects caused by folding and reinforcing impact resistance, and an upper film for the flexible display device.

2. Description of the Related Art

A display device such as an organic light emitting device includes a display panel, and the display panel is manufactured with a plurality of layers and elements on a substrate. Conventionally, glass is used as the substrate of the display panel. However, as the glass substrate is rigid, it may difficult to bend or deform the display device including the glass as the substrate thereto. Recently, a flexible display device using a flexible substrate such as plastic that is light and is easily transformed has been developed.

The flexible display device may be classified into a bendable display device, a foldable display device, and a rollable display device according to its use and form. The flexible display device may be bent or folded by using a flexible substrate made of a material such as plastic.

Further, the recent display device may include a function of sensing a touched position when a screen is touched, and it may sense a hand touch or a pen touch depending on the display device types.

SUMMARY

Embodiments of the invention provide a flexible display device for reinforcing impact resistance and prevent defects generated when bent, such as a fracture, and an upper film for a flexible display device.

An embodiment provides a flexible display device including: a display panel including a touch sensor, where the display panel is foldable with respect to a folding axis; a cover window disposed on a front surface of the display panel; and a front surface film disposed on a front surface of the cover window, wherein the front surface film includes a protection film, and a base film having a transverse direction, and the transverse direction is perpendicular to a direction of the folding axis.

In an embodiment, a thickness of the protection film may be equal to or greater than about 20 μm and equal to or less than about 80% of a thickness of the base film.

In an embodiment, the protection film may be disposed on a rear surface of the base film.

In an embodiment, the protection film may include a polyurethane, a mixed resin including a polyurethane, or a copolymer including at least one resin including a urethane functional group.

In an embodiment, the base film may include at least one selected from a polyimide, a polycarbonate, a polymethyl methacrylate, a polyethylene terephthalate ("PET"), a cycloolefin polymer, and a triacetyl cellulose.

In an embodiment, the base film may have a thickness of equal to or greater than about 50 micrometers (μm) and equal to or less than about 125 μm.

In an embodiment, a radius of curvature of the flexible display device in a bent state may be about 1.5 millimeters (mm).

In an embodiment, the protection film or the base film may have a haze value of equal to or less than about 2% and transmittance of equal to or greater than about 85%.

In an embodiment, the front surface film may further include a hard coating layer disposed on a front surface of the base film.

In an embodiment, the flexible display device may further include a lower film attached to a rear surface of the display panel.

In an embodiment, the flexible display device may further include a polarizer disposed between the display panel and the cover window.

In an embodiment, the display panel may include a first display area including a plurality of pixels and a second display area including a light transmitting region, where the second display area may correspond to an optical element including a camera or a photosensor.

An embodiment provides an upper film for a flexible display device including: a protection film including a polyurethane; and a base film having a transverse direction, wherein a thickness of the protection film is equal to or greater than about 20 μm and equal to or less than about 80% of a thickness of the base film.

In an embodiment, the protection film may be disposed on a rear surface of the base film.

In an embodiment, the protection film may include a polyurethane, a mixed resin including a polyurethane, or a copolymer including at least one resin including a urethane functional group.

In an embodiment, the base film may include at least one selected from a polyimide, a polycarbonate, a polymethyl methacrylate, a PET, a cycloolefin polymer, and a triacetyl cellulose.

In an embodiment, the base film may have a thickness of equal to or greater than about 50 μm and equal to or less than about 125 μm.

In an embodiment, a radius of curvature of the flexible display device in a bent state may be about 1.5 mm.

In an embodiment, the protection film or the base film may have a haze value of equal to or less than about 2% and transmittance of equal to or greater than about 85%.

In an embodiment, the upper film may further include a hard coating layer disposed on a front surface of the base film.

According to embodiments of the invention, the flexible display device includes a protection film including a polyurethane and the upper film including a base film on the upper side of the window to reinforce impact resistance by the protection film. In such embodiment, the base film is disposed in a way such that the transverse direction having the greatest modulus is perpendicular to the folding axis to reinforce the modulus, thereby preventing defects generated caused by the fracture when bent.

BRIEF DESCRIPTION OF THE DRAWINGS

FIG. 9 and FIG. 10 are tables showing compressed stress values and folding estimating results in various display devices.

FIG. 12 and FIG. 13 show folding estimation results in a display device according to an embodiment and a comparative example.

DETAILED DESCRIPTION

Figure 1:
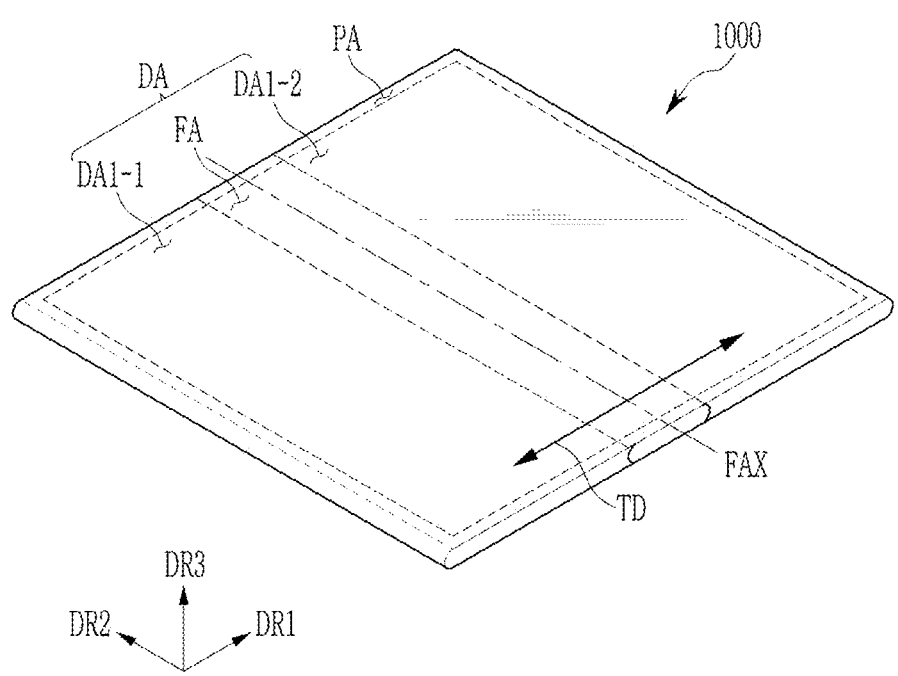
FIG. 1 shows a perspective view of a display device according to an embodiment.

The invention will be described more fully hereinafter with reference to the accompanying drawings, in which various embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Parts that are irrelevant to the description will be omitted to clearly describe embodiments of the invention, and the same elements will be designated by the same reference numerals throughout the specification.

The size and thickness of each configuration shown in the drawings are arbitrarily shown for better understanding and ease of description, but the invention is not limited thereto. The thickness of layers, films, panels, regions, etc., are enlarged for clarity. The thicknesses of some layers and areas are exaggerated for convenience of illustration.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

The phrase "in a plan view" means viewing an object portion from the top, and the phrase "in a cross-sectional view" means viewing a cross-section of which the object portion is vertically cut from the side.

Throughout the specification, when it is described that a part is "connected (in contact with, coupled)" to another part, the part may be "directly connected" to the other element, may be "connected" to the other part through a third part, or may be connected to the other part physically or electrically, and they may be referred to by different titles depending on positions or functions, but respective portions that are substantially integrated into one body may be connected to each other.

When the parts such as wires, layers, films, regions, plates, or constituent elements are described to extend in the "first direction or the second direction", this not only signifies a straight-line shape running straight in a corresponding direction, but also includes a structure generally extending in the first direction or the second direction, a structure bent on a predetermined portion, a zigzag-shaped structure, or a structure including a curved structure and extending.

Electronic devices (e.g., mobile phones, televisions ("TV"s), monitors, laptop computers, etc.,) including the display device and the display panel described in the specification or the electronic devices including the display device and the display panel manufactured by a manufacturing method described in the specification are not excluded from the claimed range of the specification.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

A flexible display device according to an embodiment will now be described with reference to FIG. 1.

FIG. 1 shows a perspective view of a display device according to an embodiment.

The flexible display device 1000 represents a device for displaying videos or still images, and it may be used as a display screen for portable electronic devices such as mobile phones, smartphones, tablet personal computers ("PC"), mobile communication terminals, electronic organizers, electronic books, portable multimedia players ("PMP"), global positioning systems, or ultra mobile PCs ("UMPC"), and also for various products such as televisions, laptops, monitors, advertisement boards, or internet of things ("IOT"). The flexible display device 1000 may also be used to wearable devices such as smart watches, watch phones, glass-type displays, or head mounted displays ("HMD"). The flexible display device 1000 may be used as a dashboard of a vehicle, a center information display ("CID") disposed on a center fascia or a dashboard of a vehicle, a room mirror display replacing a side-view mirror of a vehicle, and a display disposed on a rear side of a front seat for entertainment for a back seat of a vehicle.

Referring to FIG. 1, an embodiment of the flexible display device 1000 may display images in a third direction DR3 from a displaying side in parallel to a first direction DR1 and a second direction DR2. The displaying side for displaying images may correspond to a front surface of the flexible display device 1000, and the images may include videos and still images.

In an embodiment, front surfaces (or upper surfaces) and rear surfaces (or lower surfaces) of respective members are defined with reference to the image displaying direction. The front surface and the rear surface may oppose each other in the third direction DR3, and normal-line directions of the front surface and the rear surface may be parallel to the third direction DR3. A spaced distance between the front surface and the rear surface in the third direction DR3 may correspond to a thickness of the display panel DP in the third direction DR3.

The flexible display device 1000 may sense a user input applied from the outside. The user input may include various types of external inputs such as some of a human body of the user, light, heat, or pressures. In an embodiment, the user input may be an input generated by a finger of the user applied to the front surface or a pen input such as a stylus used by the user, but the invention is not limited thereto. The flexible display device 1000 may sense the user input applied to a lateral surface or the rear surface of the flexible display device 1000 according to the structure of the flexible display device 1000.

In an embodiment, the flexible display device 1000 may include a display area DA and a peripheral area PA (also referred to as a non-display area). The display area DA displays images, and external inputs may be simultaneously sensed therein. A plurality of pixels may be disposed in the display area DA.

Figure 2:
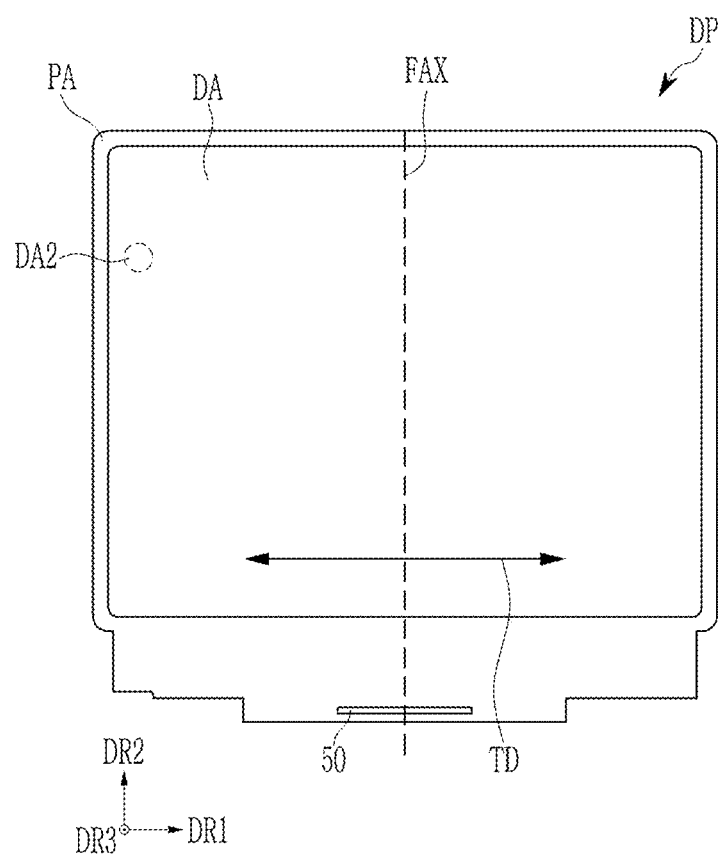
FIG. 2 shows a top plan view of a display panel according to an embodiment.

The display area DA may include a first display area and a second display area (refer to DA2 of FIG. 2).

A plurality of light emitting diodes ("LED"s) and a plurality of pixel circuit units for generating light emitting currents and transmitting the same to the LEDs are disposed in the first display area. Here, one LED and one pixel circuit unit may configure or collectively define a pixel PX. One pixel circuit unit and one LED are disposed one-to-one in the first display area DA1. The first display area will also be referred to as a normal display area.

The first display area may be divided into a first-first display area DA1-1, a second first display area DA1-2, and a folding area FA. The first first display area DA1-1 and the second first display area DA1-2 may be positioned at a left side and a right side of the folding axis FAX, and the folding area FA may be positioned between the first first display area DA1-1 and the second first display area DA1-2. When folded to an outside with respect to the folding axis FAX (i.e., in-folded), the first first display area DA1-1 and the second first display area DA1-2 are positioned at respective sides in the third direction DR3 and may display images in the respective directions. When folded to an inside with respect to the folding axis FAX (i.e., out-folded), the first first display area DA1-1 and the second first display area DA1-2 may not be seen from the outside.

Figure 3:
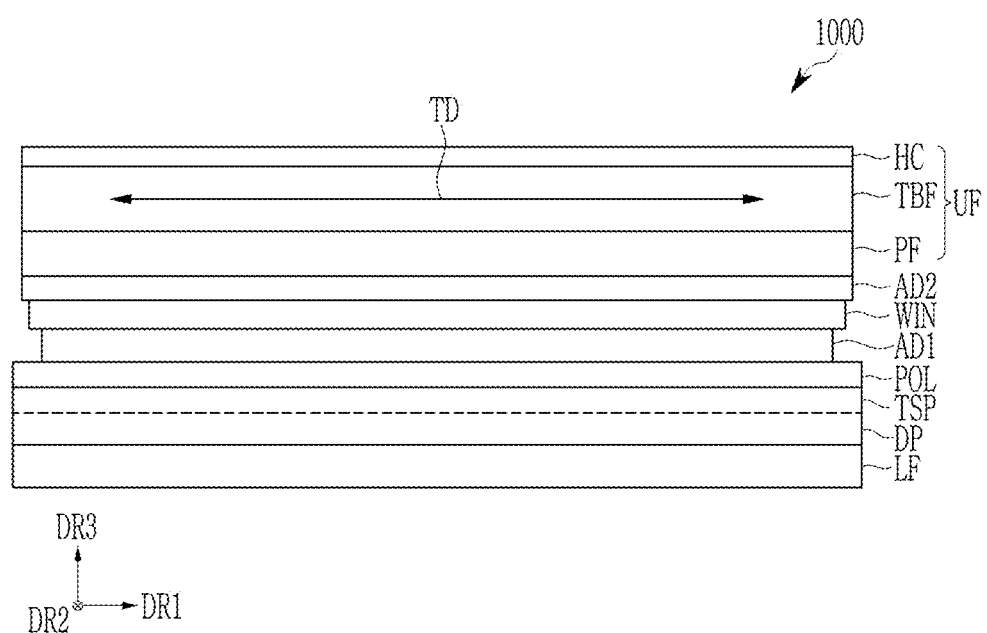
FIG. 3 shows a cross-sectional view of a display device according to an embodiment.

In an embodiment described with reference to FIG. 1, the folding axis FAX extends in the second direction DR2, and an arrow TD is further shown in the first direction DR1 that is perpendicular to the direction of the folding axis FAX in FIG. 1. The arrow TD is shown in the flexible display device 1000 indicates the direction (or a transverse direction TD) in which a base film TBF included in a front surface film UF positioned on the front surface of the display panel DP is attached as shown in FIG. 3. In such an embodiment, the transverse direction TD of the base film TBF is arranged to be perpendicular to the folding axis FAX. Features of embodiments having such a structure will be described in detail later in greater detail.

In an embodiment, the display area DA may further include the second display area (refer to DA2 in FIG. 2), which will be described later with reference to FIG. 2.

A planar structure of a display panel DP included in an embodiment of the flexible display device 1000 will be described with reference to FIG. 2.

FIG. 2 shows a top plan view of a display panel according to an embodiment.

In an embodiment, a display area DA is positioned on the front surface of the display panel DP included in the flexible display device 1000, and the display area DA is divided into a first display area DA1 (also referred to as a main display area) and a second display area DA2 (also referred to as a component region).

The first display area DA1 includes a plurality of LEDs, and a plurality of pixel circuit units for generating light emitting currents and transmitting the light emitting currents to LEDs. One LED and one pixel circuit unit may configure or collectively define a pixel PX. One pixel circuit unit and one LED are disposed one-to-one in the first display area DA1. The first display area DA1 will also be referred to as a normal display area.

The second display area DA2 may include a light transmitting region and may additionally include a pixel for displaying images. The second display area DA2 may at least partly overlap an optical element such as a camera or a photosensor. In an embodiment, the second display area DA2 may be in a form of a circle on the left of the flexible display device 1000 as shown in FIG. 2, but the invention is not limited thereto. The second display area DA2 may be provided with in plural and have another shape depending on the number and the shape of the optical element.

The flexible display device 1000 may receive external signals for optical elements through the second display area DA2, or may provide signals output by the optical elements to the outside. In such an embodiment, the second display area DA2 overlaps the light transmitting region, such that an area of the peripheral area PA may be reduced by not forming a light transmitting region therein.

In an embodiment, a boundary region may be positioned between the first display area DA1 and the second display area DA2.

The peripheral area PA may be further positioned outside the display area DA. In an embodiment, as shown in FIG. 2, the second display area DA2 is surrounded by the first display area DA1 so the area of the display area DA may not be reduced by the second display area DA2 and the area of the peripheral area PA may not be reduced.

Referring to FIG. 1 and FIG. 2, an embodiment of the flexible display device 1000 may be a foldable flexible display device. The flexible display device 1000 may be folded or foldable on an inside or an outside with respect to the folding axis FAX. When the flexible display device 1000 is folded on the outside with respect to the folding axis FAX, the displaying side of the flexible display device 1000 may be disposed on the outside in the third direction DR3, and the images may be displayed in the respective directions. When the flexible display device 1000 is folded on the inside with respect to the folding axis FAX, the displaying side may be invisible from the outside.

FIG. 2 shows that the peripheral area PA is disposed on the outside of the display area DA and the driver 50 is disposed in the peripheral area PA. The peripheral area PA is positioned on the outside of the display area DA and may be divided into the driver 50, connection wires, and a bending region. A portion of the display panel DP on which the driver 50 is positioned may be folded to the rear surface to position the driver 50 on a rear side of the display area DA and complete the flexible display device 1000 depending on embodiments.

In an embodiment, as shown in FIG. 2, the driver 50 may be positioned on a portion that corresponds to the folding axis FAX, but not being limited thereto. Alternatively, the position of the driver 50 may be changeable in many ways.

In an embodiment, as shown in FIG. 2, the folding axis FAX extends in the second direction DR2, and the arrow TD is further shown in the first direction DR1 that is perpendicular to the direction of the folding axis FAX in FIG. 1. The arrow TD is defined in the flexible display device 1000, and referring to FIG. 3, the arrow TD indicates the transverse direction TD in which a base film TBF included in a front surface film UF positioned on the front surface of the display panel DP is attached. in such an embodiment, the transverse direction TD of the base film TBF is arranged to be perpendicular to the folding axis FAX. Features of embodiments having such a structure will be described later in greater detail.

An entire cross-sectional structure of the flexible display device 1000 according to an embodiment will now be described with reference to FIG. 3.

FIG. 3 shows a cross-sectional view of a display device according to an embodiment.

In an embodiment of the flexible display device 1000, a lower film LF (also referred to as a rear surface film) is positioned below, e.g., on the rear surface of, the display panel DP, and a polarizer POL, a cover window WIN and a front surface film UF (also referred to as an upper film, or an upper film for the flexible display device) are positioned above, e.g., on the front surface of, the display panel DP.

The display panel DP may include a display unit on which a plurality of pixels are positioned and displays images, a touch sensor TSP positioned on the upper side of the display unit and sensing external inputs, and a driver (refer to 50 of FIG. 2). The display panel DP may include the display area DA and the peripheral area PA. The display area DA may be a region in which a plurality of pixels are operable by electrical signals and emit light. The pixels are positioned on a lower portion of the touch sensor TSP of the display panel DP to display images in the third direction DR3, and the touch sensor TSP is positioned on the upper side in the third direction DR3 of the pixels to sense external inputs.

The lower film LF may be positioned on the rear surface of the display panel DP, and the lower film LF may protect the lower portion of the display panel DP from impacts and may include a thin metal plate so that the flexible display device 1000 may maintain to be folded when it is folded with respect to the folding axis FAX. The metal plate may be disposed to overlap the entire region of the display panel DP.

The cover window WIN is attached to the front surface of the display panel DP by a first adhesive layer AD1.

The cover window WIN may be divided into a transmitting region and a blocking region, and the transmitting region may at least partly overlap the display area DA of the display panel DP. In an embodiment, for example, the transmitting region may overlap the front surface of the display area DA or may overlap at least part of the display area DA. In such an embodiment, the user may view the image through the transmitting region, or may provide external input based on the image. However, the invention is not limited thereto. In an alternative embodiment, for example, the region for displaying images may be separated from the region for sensing external inputs in the display area DA.

The peripheral area PA of the display panel DP may at least partly overlap a blocking region of the cover window WIN. The peripheral area PA may be covered by the blocking region. The peripheral area PA may be disposed adjacent to the display area DA and surround display area DA. The peripheral area PA displays no images, and a driving circuit or a driving wire for driving the display area DA may be disposed therein.

The flexible display device 1000 may be a foldable display device with a wide screen of equal to or greater than ten inches. In a case where the cover window WIN is made of glass, the glass may be damaged or broken when the cover window WIN is folded. Accordingly, in an embodiment, the cover window WIN may include or be made of a polymer film.

The display panel DP may be assembled in a way such that the display area DA and the peripheral area PA may face the cover window WIN. However, the invention is not limited thereto.

In an embodiment, a stylus pen may be used for products to which the wide screen of equal to or greater than ten inches is applied, and it is desired for the flexible display device 1000 of equal to or greater than ten inches to simultaneously acquire a folding characteristic and impact resistance for the stylus pen. The front surface film UF for acquiring the folding characteristic and the impact resistance will now be described.

The front surface film UF is attached to the front surface of the cover window WIN by the second adhesive layer AD2.

The front surface film UF includes a protection film PF, a base film TBF, and a hard coating layer HO.

The hard coating layer HC protects the flexible display device 1000 from impacts from the outside and is coated on the front surface of the base film TBF that is the most frontal surface of the front surface film UF.

The base film TBF and the protection film PF positioned on the lower portion of the hard coating layer HC increase impact resistance for reducing the impacts transmitted to the display panel DP together with the flexible characteristic of the flexible display device 1000. The impact resistance may prevent defects from being generated to the display panel DP when the user uses a stylus pen and an impact is applied to the front surface of the flexible display device 1000 by the stylus pen.

The protection film PF may reinforce impact resistance and may also be referred to as an impact resistance layer. The protection film PF may include or be made of a polyurethane, may include or be made of a mixed resin including the polyurethane, or may include a copolymer including at least one resin including a urethane functional group. The urethane functional group may include —NH (Peak (3200-3300 $cm^{-1}$)) or —C═O (Peak (1700-1750 $cm^{-1}$)).

The impact resistance may be increased by increasing the thickness of the protection film PF, but when the protection film PF becomes thick, a repulsive power increases when the flexible display device 1000 is folded, and reliability at the time of folding (or during a process of folding) is deteriorated. To maintain the impact resistance and acquire the folding reliability, the thickness of the protection film PF may be set to be equal to or greater than about 20 micrometers (μm) and equal to or less than about 80% of the thickness of the base film TBF.

The protection film PF is positioned on the rear surface of the base film TBF.

Figure 5:
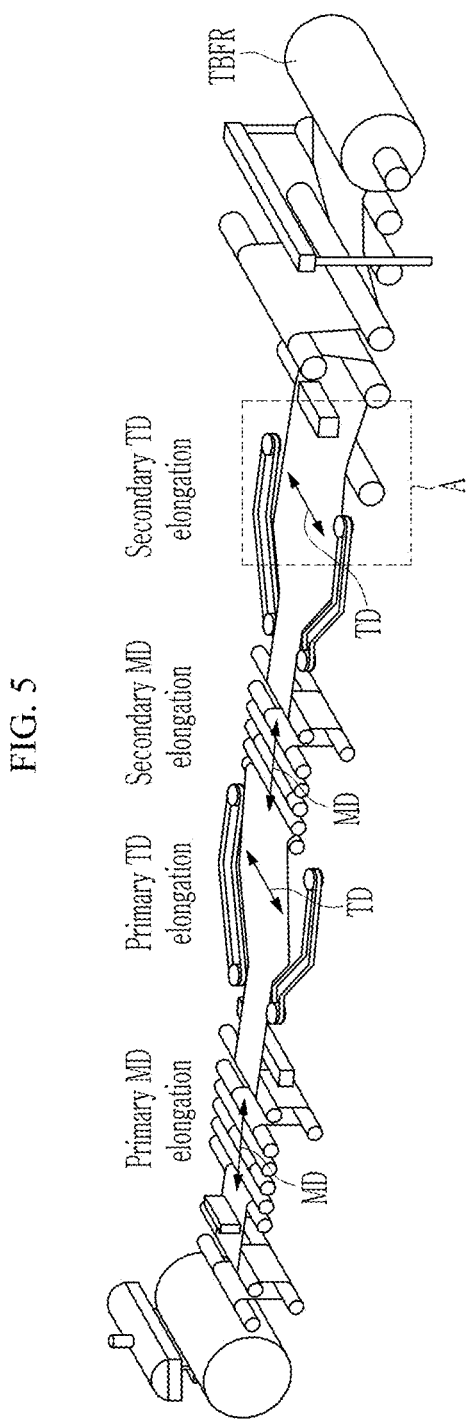
FIG. 5 shows a process for manufacturing a base film according to an embodiment.

Referring to FIG. 5, the base film TBF is biaxially elongated, and the elongating directions include a transverse direction TD and a machine direction MD that is perpendicular to the transverse direction TD, and the transverse direction TD of the base film TBF is arranged to be perpendicular to the folding axis FAX of the flexible display device 1000. The machine direction MD of the base film TBF may be parallel to the folding axis FAX of the flexible display device 1000.

in an embodiment, an angle between the machine direction MD of the base film TBF and the folding axis FAX may be equal to or less than about 10 degrees, considering errors.

Figure 11:
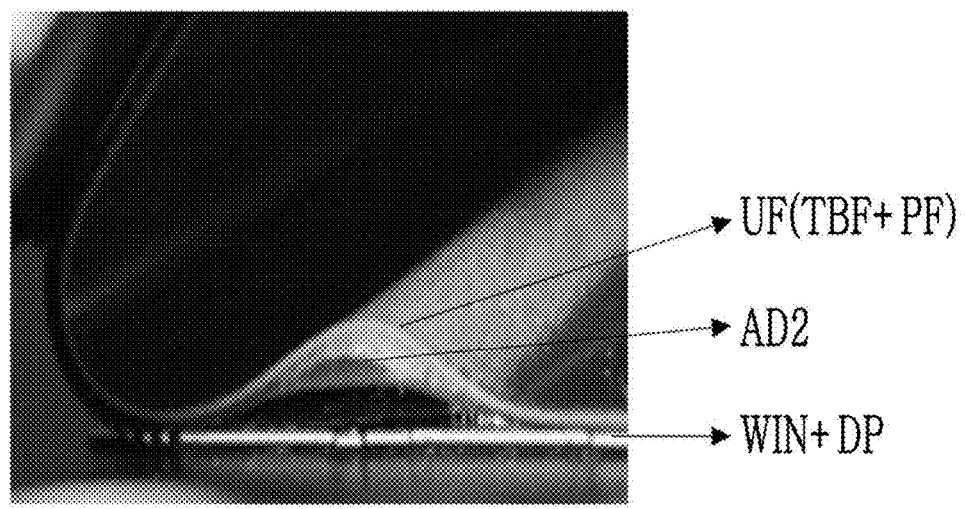
FIG. 11 is a photograph showing a delamination phenomenon of an upper film in a display device according to a comparative example.
Figure 13:
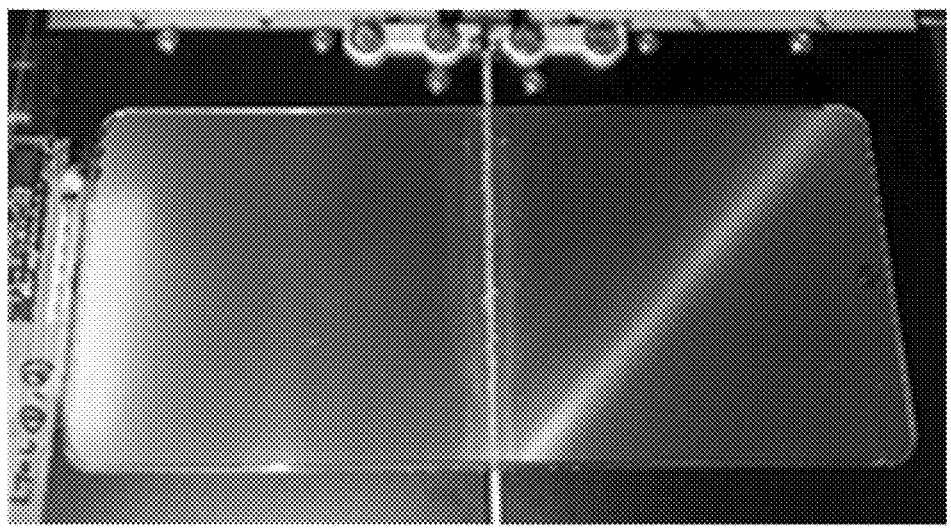

In an embodiment, the transverse direction TD of the base film TBF is provided to be perpendicular to the folding axis FAX of the flexible display device 1000 to overcome drawbacks of a low modulus of the protection film PF. In such an embodiment, when the flexible display device 1000 is folded, the flexible display device 1000 may be increased or decreased in a perpendicular direction to the folding axis FAX, the modulus is increased in the perpendicular direction to the folding axis FAX, and a value of the modulus of the base film TBF in the transverse direction TD is greater than a value thereof in the machine direction MD. Accordingly, in such an embodiment, the transverse direction TD of the base film TBF is disposed in the perpendicular direction to the folding axis FAX. As a result, the modulus value and/or an elastic force is increased in the increasing or decreasing direction when the flexible display device 1000 is folded, thereby preventing defects generated by the folding. The defects may occur by the folding of the flexible display device 1000 in a case in which the modulus value and/or the elastic force is small and the front surface film UF is peeled off as shown in FIG. 11, or a case in which the front surface film UF and the flexible display device 1000 are fractured as shown in FIG. 13.

The base film TBF has a transparent characteristic and may include or be made of a resin including at least one selected from a polyimide, a polycarbonate, a polymethyl methacrylate, a polyethylene terephthalate ("PET"), a cycloolefin polymer, and a triacetyl cellulose. Hereinafter, for convenience of description, embodiments where the base film TBF includes or is made of a PET will be mainly described. In an embodiment, a thickness of the base film TBF may be equal to or greater than about 50 μm and equal to or less than about 125 μm. In such an embodiment, a thickness of the protection film PF may be equal to or greater than about 20 μm and equal to or less than about 100 μm, and may be equal to or less than about 80% of the thickness of the base film TBF.

A numerical value of the thicknesses of the base film TBF and the protection film PF is in a numerical range defined in a case where a radius of curvature of the folded flexible display device 1000 in a folded state is about 1.5 mm. In an embodiment, when the folded radius increases, the thickness range of the base film TBF and the protection film PF may also be increased by the increased ratio. In an embodiment, for example, where the flexible display device 1000 is folded with the radius of curvature of 3 mm, the thickness of the protection film PF may be equal to or greater than about 40 μm and equal to or less than about 80% of the thickness of the base film TBF, and the thickness of the base film TBF may be equal to or greater than about 100 μm and equal to or less than about 250 μm.

In an embodiment, the base film TBF and/or the protection film PF may have a transparent characteristic, and regarding the transparent characteristic, a haze value may be equal to or less than about 2%, e.g., the haze value may be equal to or less than about 1% and transmittance may be equal to or greater than about 85%. In such an embodiment where the haze value of the base film TBF and/or the protection film PF is equal to or greater than about 2% or the transmittance is less than about 85%, displaying quality of the display device may be deteriorated.

A relationship between the transverse direction TD of the base film TBF and the extending direction of the folding area FA, that is, the direction of the folding axis FAX, will now be described in detail with reference to FIG. 4.

Figure 4:
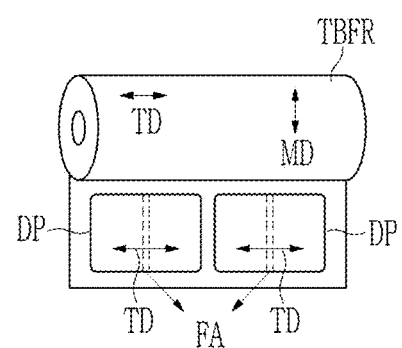
FIG. 4 shows a conceptual diagram of an elongation direction of a base film and a direction of a folding axis in a display device according to an embodiment.

FIG. 4 shows a conceptual diagram of an elongation direction of a base film and a direction of a folding axis in a display device according to an embodiment.

Referring to FIG. 4, a base film roll TBFR wound as a roll is illustrated, and two elongation directions (the transverse direction TD and the machine direction MD) are shown on the base film roll TBFR.

The base film TBF provided by the base film roll TBFR is attached to the front surface of the display panel DP in a way such that the extending direction of the folding area FA of the display panel DP may be perpendicular to the transverse direction TD and a stress at the time of folding may be applied to the transverse direction TD. The extending direction of the folding area FA is parallel to the direction of the folding axis FAX, and the direction of the folding axis FAX may be parallel to the machine direction MD. in an embodiment an angle between the machine direction MD of the base film TBF and the folding axis FAX may be equal to or less than about 10 degrees, considering errors.

The front surface film UF having characteristics described above may obtain impact resistance by using the protection film PF, allows easy folding by forming the protection film PF that is not thick, and allow the transverse direction TD of the base film TBF to be perpendicular to the folding axis FAX to relieve the low modulus characteristic of the protection film PF, thereby reinforcing the modulus and/or the elastic force and preventing a delamination phenomenon or a fracture phenomenon from occurring at the time of folding.

A process for manufacturing a base film TBF and a characteristic of an elongated base film TBF will now be described with reference to FIG. 5 and FIG. 6.

The process for manufacturing a base film TBF will now be described with reference to FIG. 5.

FIG. 5 shows a process for manufacturing a base film according to an embodiment.

As shown in FIG. 5, the base film TBF is biaxially elongated in two directions and is cooled to be formed, and the base film TBF is elongated twice for the respective directions.

In an embodiment, regarding the manufacturing process of FIG. 5, the resin including a PET is melted and extruded, the resin is primarily elongated in the machine direction MD, the resin is primarily elongated in the transverse direction TD, the resin is secondarily elongated in the machine direction MD, and the resin is secondarily elongated in the transverse direction TD to complete the base film TBF. When the melted and extruded resin passes through a cooling roll, the resin may undergo a cooling process, and the cooled and biaxially elongated base film TBF may be wound to be a base film roll TBFR.

A portion A is marked on the base film TBF after secondary elongation in the transverse direction TD in FIG. 5. The portion A will be described in detail with reference to FIG. 6, and changes of the characteristic of the base film TBF will now be described with reference to FIG. 6.

Figure 6:
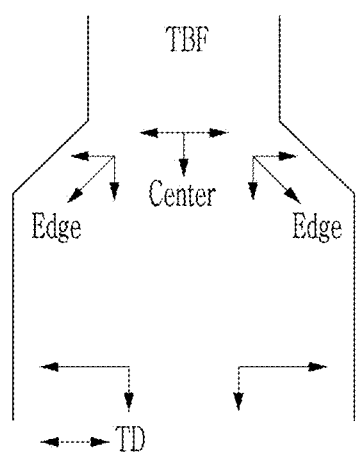
FIG. 6 shows a conceptual diagram of changes of characteristics of a process for manufacturing a base film according to an embodiment.

FIG. 6 shows a conceptual diagram of changes of characteristics of a process for manufacturing a base film according to an embodiment.

FIG. 6 illustrates that the base film TBF is elongated and molecules are further aligned in the arrow direction, and a molecular alignment characteristic according to elongation of a center portion and an edge portion of the base film TBF may be different from each other. Regarding the manufacturing method according to FIG. 5, the transverse direction TD has a greater elongation ratio than the machine direction MD, an order is progressed after the elongation in the machine direction MD, and the modulus according to the elongation and the alignment in the transverse direction has a greater value. The direction that is tensioned the latest when the base film TBF is manufactured may have the biggest modulus value. In the case of the direction with a great modulus value as described above, the base film TBF may not be easily torn and may sufficiently stand the compressed/tensioned stress. Hence, as the modulus of the base film TBF in the transverse direction TD is greater than the modulus of the base film TBF in the machine direction MD, the folding axis FAX is disposed to be perpendicular to the transverse direction TD to maximize rigidity and durability of the base film TBF, and the folding stress generated in the case of folding is applied to the transverse direction TD to prevent generation of defects caused by the folding.

In addition, when it is unclear which direction of the base film TBF is the transverse direction TD, the modulus values for the respective directions are measured, and the direction having the greatest modulus value may be the transverse direction TD.

Characteristics of the front surface film UF and the flexible display device 1000 according to an embodiment will now be described with reference to FIG. 7 to FIG. 13.

Bright spot defects and crack defect characteristics with respect to the thickness of the front surface film UF will now be described with reference to FIG. 7 and FIG. 8.

Figure 7:
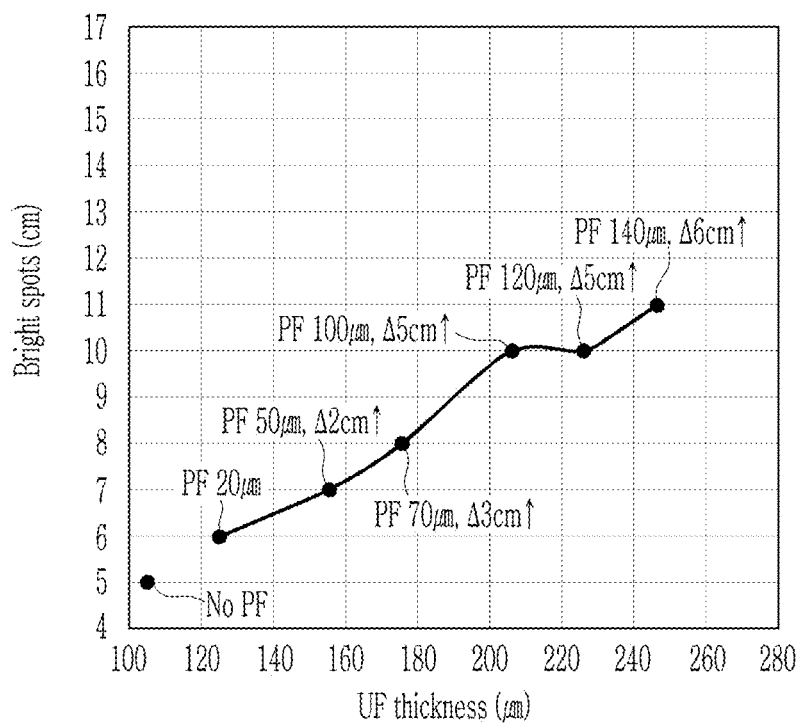
FIG. 7 shows a graph of a relationship between thicknesses of an upper film and generation of bright spots in a display device according to an embodiment.
Figure 8:
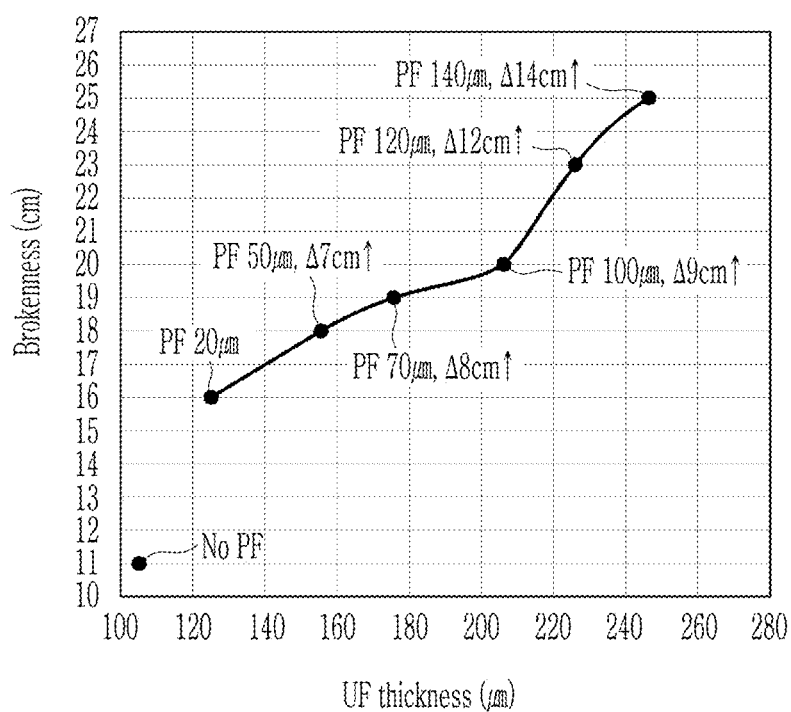
FIG. 8 shows a graph of a relationship between thicknesses of an upper film and generation of crack (brokenness) in a display device according to an embodiment.

FIG. 7 shows a graph of a relationship between thicknesses of an upper film and generation of bright spot defects in a display device according to an embodiment, and FIG. 8 shows a graph of a relationship between thicknesses of an upper film and generation of crack (brokenness) in a display device according to an embodiment.

FIG. 7 and FIG. 8 show heights of pens at which bright spot defects (i.e., defects occurring when pixels are broken and white is displayed) or crack defects (i.e., defects occurring when the cover window WIN is broken) are generated when a pen is dropped on the flexible display device 1000, and in this instance, the thickness of the front surface film UF and the thickness of the protection film PF included in the front surface film UF are also marked. Further, "No PF" indicates the front surface film UF including no protection film PF according to a comparative example, and how high the positions at which the defects are generated compared to the comparative example is shown on the right of the respective numerical values.

Referring to FIG. 7 and FIG. 8, compared to the comparative example including no protection film PF, it is shown that the use of the front surface film UF including a protection film PF increases the height at which the bright spot defects and the crack defects are generated. The protection film PF includes a polyurethane, and as the protection film PF becomes thick, the protection function thereof improves.

Particularly, referring to FIG. 7 and FIG. 8, it is shown that the thickness of the protection film PF is proportional to the height at which the bright spot defects or the crack defects are generated. However, as shown in FIG. 8, when compared to the comparative example including no protection film PF, the embodiment in which the thickness of the protection film PF is 20 μm shows a crack improving effect of 5 cm, but the improving effect of the bright spot is 1 cm, so when the thickness of the protection film PF is set to be less than 20 μm, the impact resistance is improved by less than 1 cm. Accordingly, in an embodiment, the thickness of the protection film PF may be formed to be at least 20 μm. As the thickness of the protection film PF increases, a lesser amount of the bright spot defects or the crack defects are generated. However, when the thickness of the protection film PF increases more than a certain extent, it may be difficult to bend the flexible display device 1000, and the front surface film UF may be peeled off.

The thickness of the protection film PF for preventing the front surface film UF from peeling off, and the thickness of the base film TBF and/or the thickness of the front surface film UF, will now be described with reference to FIG. 9 to FIG. 11.

FIG. 9 and FIG. 10 are tables showing compressed stress values and folding estimating results in various display devices, and FIG. 11 is a photograph showing a delamination phenomenon of an upper film in a display device according to a comparative example.

FIG. 9 shows values (analysis values) obtained by calculating the compressed stresses with respect to the thickness of the front surface film UF. Referring to FIG. 9, it is shown that the front surface film UF receives a compressed stress in the case of in-folding, and as the thickness of the front surface film UF increases, the compressed stress applied to the front surface film UF also increases.

The delamination phenomenon generated by performing the folding operation on the respective thicknesses of the front surface film UF 150,000 times in a high-temperature and high-humidity condition of the temperature of 60° C. and humidity of 93% may, as shown in FIG. 11, represent a phenomenon in which the front surface film UF in which the protection film PF including a polyurethane is stacked on the base film TBF is peeled off on the front surface of the cover window WIN and the display panel DP.

The delamination phenomenon is generated when the thickness of the front surface film UF increases and the compressed stress is increased. Regarding the in-folding by which the cover window WIN and the front surface film UF are folded inward, the protection film PF receives the compressed stress, and when the compressed stress is increased, which may cause the stacked structure to be peeled off. Therefore, when the folding characteristic is considered, the thickness of the protection film PF may be limited to improve the durability on the bright spots and the crack.

For this purpose, it is tested whether the peeling off is generated by using embodiments and comparative examples as shown in FIG. 10.

FIG. 10 shows four embodiments (embodiment 1, embodiment 2, embodiment 3, and embodiment 4) and three comparative examples (comparative example 1, comparative example 2, and comparative example 3) with respect to the thicknesses of the protection film PF and the base film TBF included in the front surface film UF.

The folding operation is performed for the respective embodiments and examples 150,000 times in the high-temperature and high-humidity condition of the temperature of 60° C. and the humidity of 93%, and cases in which no peeling off is generated are marked as "OK", while cases in which the peeling off is generated are marked as "Film peeled off".

In detail, reliability estimation results for respective thicknesses of the protection film PF for improving impact resistance performance are as follows.

The protection film PF is made by coating or stacking a polyurethane resin on the rear surface of the base film TBF, and the thickness of the protection film PF is set to be equal to or greater than 20 μm to improve the impact resistance performance. However, when the thickness of the protection film PF is increased, the compressed stress and the tensioned stress at the time of folding increase, folding reliability may be deteriorated, and the film may be peeled off. Referring to FIG. 10, it is shown that reliability results are changed according to the thickness ratio of the front surface film UF and the protection film PF at the time of folding, the film peeling off is generated in the case of folding estimation in the high-temperature and high-humidity condition when the thickness ratio of the front surface film UF to the protection film PF is equal to or greater than 100%, and the film peeling off is not generated when the thickness ratio of the front surface film UF to the protection film PF is equal to or less than 80%. Therefore, in an embodiment, the thickness of the protection film PF that is an impact resistance layer is less than the thickness of the base film TBF by equal to or less than 80%, such that the film peeling off is not generated in the high-temperature and high-humidity condition, and folding reliability is obtained.

A difference of characteristics according to the transverse direction TD of the base film TBF and the direction of the folding axis FAX will now be described in detail with reference to FIG. 12 and FIG. 13.

FIG. 12 and FIG. 13 show folding estimation results in a display device according to an embodiment and a comparative example.

Referring to FIG. 12, the embodiment 5 is an example in which the transverse direction TD of the base film TBF is perpendicular to the direction of the folding axis FAX, and the comparative example 4 is an example in which the transverse direction TD of the base film TBF is parallel to the direction of the folding axis FAX. The modulus value of the base film TBF in the transverse direction TD is 5.0 gigapascals (GPa), and the modulus value of the base film TBF in the machine direction MD is 4.1 GPa.

Referring to FIG. 12 and FIG. 13, when the base film TBF is cut and attached in a way such that the folding axis is parallel to the transverse direction TD with a greater modulus value as in the comparative example 4 in the case of folding reliability estimation in the low temperature condition (−20° C.), fracture is generated. However, when the base film TBF is cut and attached in a way such that the folding axis is perpendicular to the transverse direction TD with a big modulus value as in the embodiment 5, the fracture is not generated. Here, the embodiment 5 may have the thickness of the protection film PF satisfying the results of FIG. 7 to FIG. 10, and the protection film PF may have the thickness of equal to or greater than 20 μm and equal to or less than 80% of the thickness of the base film TBF.

In an embodiment of the flexible display device 1000, the bright spot defects and the crack defects that are typical defect phenomena generated in the pen dropping estimation are improved by 1.2 times to twice, and the folding reliability in the low temperature (−20° C.) condition and the high-temperature and high-humidity (60° C., and the 93%) condition may also be obtained without the peeling off problem or the fracture of the base film TBF. Therefore, in such an embodiment, the impact resistance is obtained by using the protection film PF as the front surface film UF, and the folding is easily performed with the protection film PF that is not too thick, and the transverse direction TD of the base film TBF is disposed to be perpendicular to the folding axis FAX to ease the low modulus characteristic of the protection film PF, reinforce the modulus and/or the elastic force, and remove the delamination phenomenon or the fracture phenomenon generated at the time of folding.

A cross-section according to an alternative embodiment will now be described with reference to FIG. 14 and FIG. 15.

Figure 14:
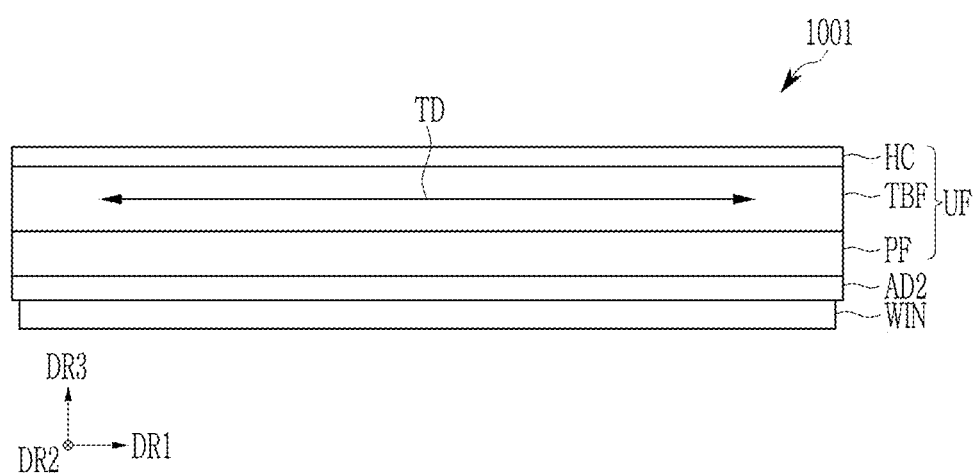
FIG. 14 and FIG. 15 show cross-sectional views of a display device according to an alternative embodiment.
Figure 15:
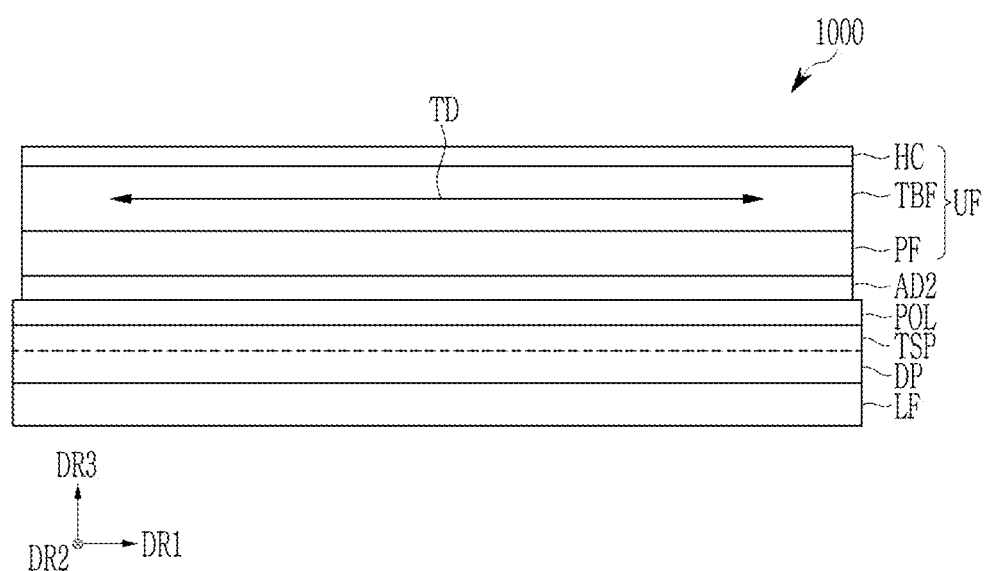

FIG. 14 and FIG. 15 show cross-sectional views of a display device according to an alternative embodiment.

FIG. 14 shows an embodiment of a structure 1001 including a front surface film UF and a cover window WIN in the flexible display device 1000 described with reference to FIG. 3, and the display panel DP, the polarizer POL, and the lower film LF are omitted therefrom.

In an embodiment, the front surface film UF may be attached to the cover window WIN in a state prior to being attached to an upper side of the display panel DP, and the front surface film UF and the cover window WIN attached to each other may be transported or circulated such as for sale.

The cover window WIN with the structure shown in FIG. 14 may be attached to the front surface of the polarizer POL by the first adhesive layer AD1, and the flexible display device 1000 may be completed.

In an embodiment, as shown in FIG. 15, the flexible display device 1000 may not include the cover window WIN, differing from the embodiment described with reference to FIG. 3. Here, regarding the flexible display device 1000, a lower film LF (also referred to as a rear surface film) is positioned on a rear surface of the display panel DP, and a polarizer POL and front surface film UF (also referred to as an upper film) are positioned on a front surface thereof, and the cover window WIN is not included. In such an embodiment, where the cover window WIN is omitted, the front surface film UF may be thicker than that in the embodiment described with reference to FIG. 3 to protect the display panel DP. The impact resistance is obtained by using the protection film PF in the flexible display device 1000 of FIG. 15, but the folding characteristic may cause a defect as the thickness of the protection film PF increases. Accordingly, in such an embodiment, the protection film PF is attached in a way such that the transverse direction TD of the base film TBF is perpendicular to the folding axis FAX to increase the modulus value, and the defect at the time of a folding may be effectively prevented.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A flexible display device comprising:
   a display panel including a touch sensor, wherein the display panel is foldable with respect to a folding axis;
   a cover window disposed on a front surface of the display panel; and
   a front surface film disposed on a front surface of the cover window,
   wherein the front surface film includes:
      a protection film; and
      a base film which is a biaxially elongated film having elongating directions including a transverse direction and a machine direction perpendicular to the transverse dirction,
      wherein a value of a modulus of the base film in the transverse direction is greater than a value thereof in the machine direciton, and
   wherin the transverse direction is perpendicular to a direction of the folding axis.

2. The flexible display device of claim 1, wherein a thickness of the protection film is equal to or greater than about 20 µm and equal to or less than about 80% of a thickness of the base film.

3. The flexible display device of claim 2, wherein the protection film is disposed on a rear surface of the base film.

4. The flexible display device of claim 2, wherein the protection film includes a polyurethane, a mixed resin including a polyurethane, or a copolymer including a resin including a urethane functional group.

5. The flexible display device of claim 2, wherein the base film includes at least one selected from a polyimide, a polycarbonate, a polymethyl methacrylate, a polyethylene terephthalate, a cycloolefin polymer, and a triacetyl cellulose.

6. The flexible display device of claim 5, wherein the base film has a thickness of equal to or greater than about 50 µm and equal to or less than about 125 µm.

7. The flexible display device of claim 6, wherein a radius of curvature of the flexible display device in a bent state is about 1.5 mm.

8. The flexible display device of claim 6, wherein the protection film or the base film has a haze value of equal to or less than about 2% and transmittance of equal to or greater than about 85%.

9. The flexible display device of claim 2, wherein the front surface film further includes a hard coating layer disposed on a front surface of the base film.

10. The flexible display device of claim 2, further comprising:
    a lower film attached to a rear surface of the display panel.

11. The flexible display device of claim 2, further comprising:
    a polarizer disposed between the display panel and the cover window.

12. The flexible display device of claim 2, wherein the display panel includes a first display area including a plurality of pixels and a second display area including a light transmitting region,
    wherein the second display area corresponds to an optical element including a camera or a photosensor.

13. An upper film for a flexible display device comprising:
    a protection film including a polyurethane; and
    a base film which is biaxially elongated film having elongating directions including a transverse direction and a machine direction perpendicular to the transverse direction,
    wherein a value of a modulus of the base film in the transverse direction is greater than a value thereof in the machine direction, and
    wherien a thickness of the protection film is equal to or greater than about 20 µm and equal to or less than about 80% of a thickness of the base film.

14. The upper film for a flexible display device of claim 13, wherein
the protection film is disposed on a rear surface of the base film.

15. The upper film for a flexible display device of claim 13, wherein
the protection film includes a polyurethane, a mixed resin including a polyurethane, or a copolymer including at least one resin including a urethane functional group.

16. The upper film for a flexible display device of claim 13, wherein
the base film includes at least one selected from a polyimide, a polycarbonate, a polymethyl methacrylate, a polyethylene terephthalate, a cycloolefin polymer, and a triacetyl cellulose.

17. The upper film for a flexible display device of claim 16, wherein
the base film has a thickness of equal to or greater than about 50 μm and equal to or less than about 125 μm.

18. The upper film for a flexible display device of claim 17, wherein
a radius of curvature of the flexible display device in a bent state is about 1.5 mm.

19. The upper film for a flexible display device of claim 17, wherein
the protection film or the base film has a haze value of equal to or less than about 2% and transmittance of equal to or greater than about 85%.

20. The upper film for a flexible display device of claim 13, wherein
the upper film further includes a hard coating layer disposed on a front surface of the base film.

* * * * *